Patented July 13, 1943

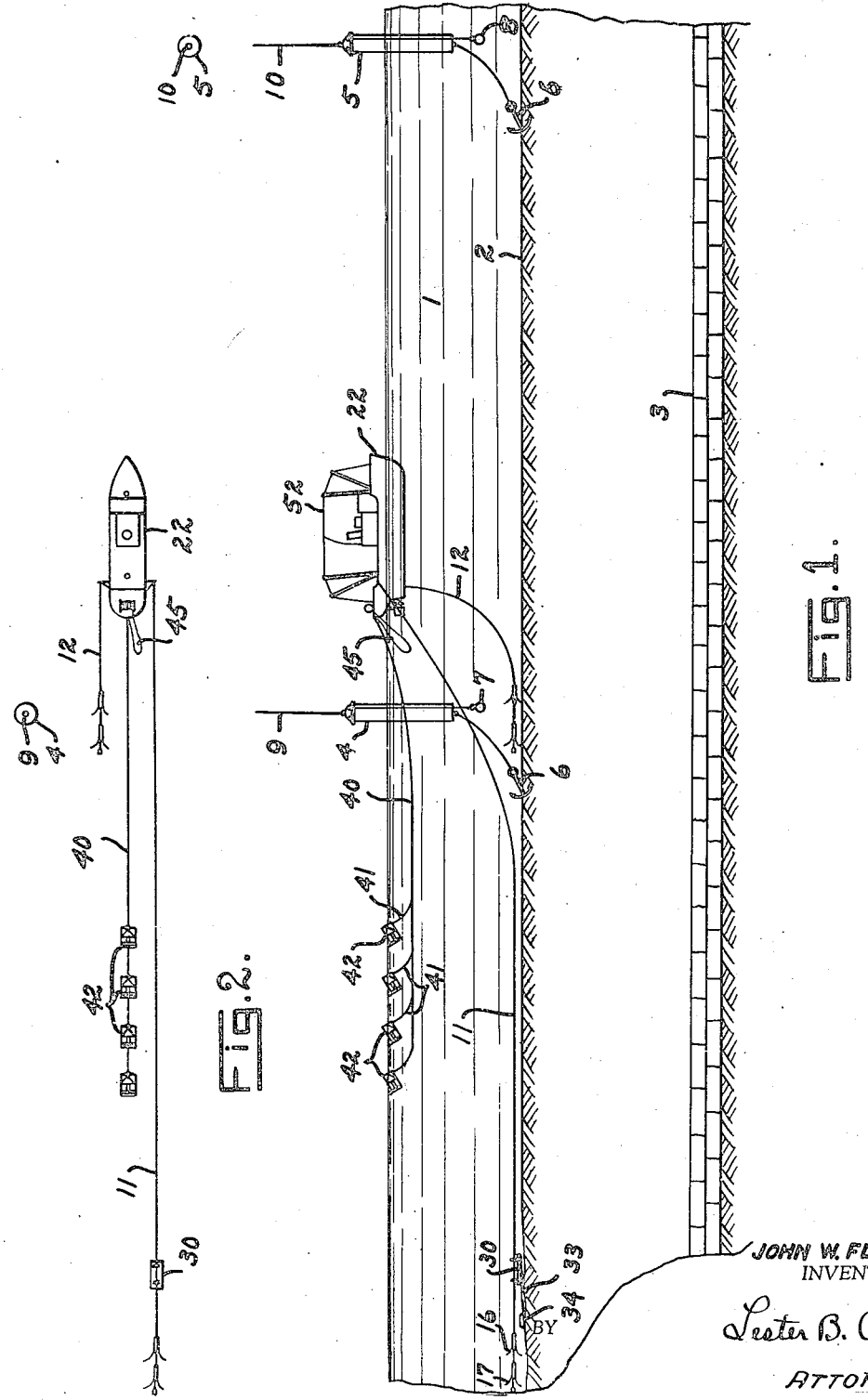

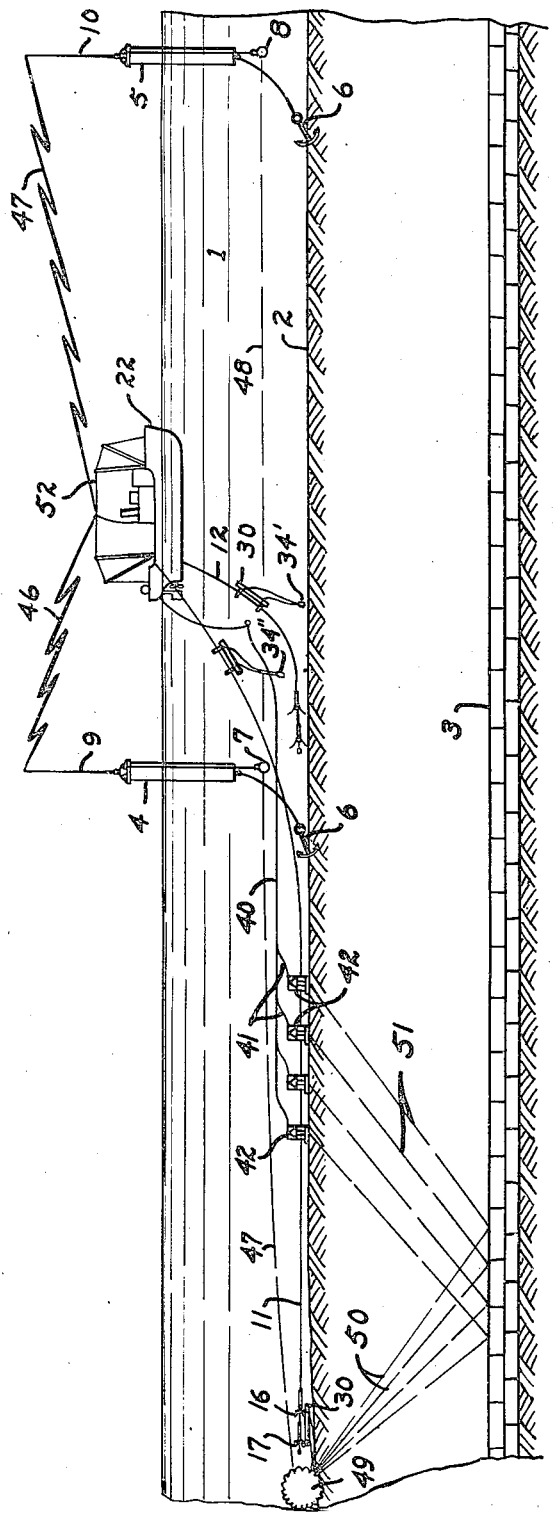

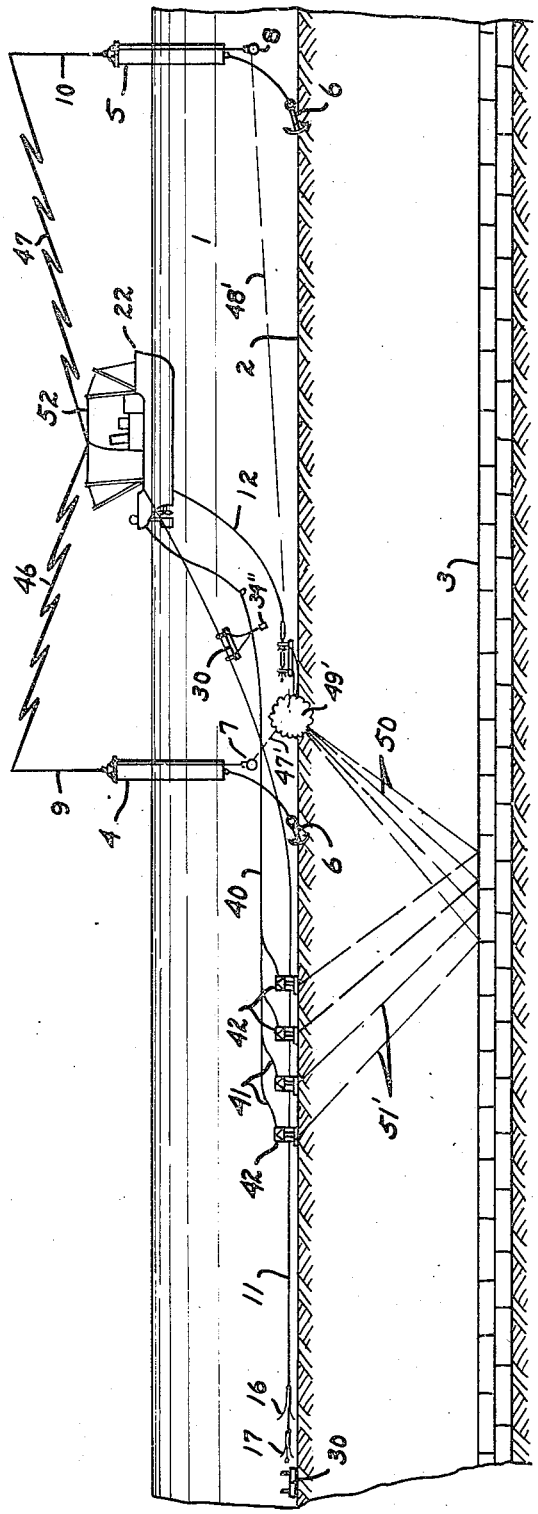
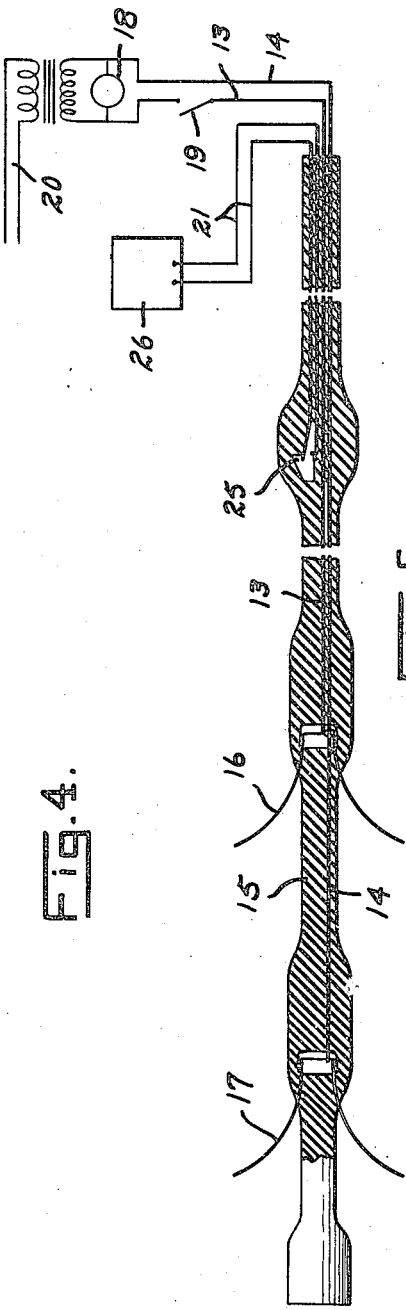

2,324,378

UNITED STATES PATENT OFFICE 2,324,378

SUBMARINE PROSPECTING

John W. Flude, Houston, Tex.

Application October 20, 1941, Serial No. 415,755

8 Claims. (Cl. 181—0.5)

This invention relates to method and apparatus for geophysical prospecting in submerged areas, and is more particularly concerned with the location of subsurface geological structures by determining the depth and extent of such structures and, as well, the geographical location of the structures even though the structures so located may be a considerable distance from visible points on land.

The invention relates to and broadly comprehends the subject matter of my copending application, Serial No. 295,198, filed September 16, 1939, now Patent No. 2,283,200, granted May 19, 1942, for Method and apparatus for subsurface mining. As was indicated in such copending application, seismic exploration for the location of subsurface geological structures is well known, a common technique being that of detonating at various points in an area a charge of explosive to create seismic waves which are detected at other points and are recorded in a manner that the time of travel between the source of the seismic waves, or the shot point, and the points of detection constitutes an indication of the nature, depth, and configuration of anomalous geological formations.

Geological structures favorable to the location of valuable deposits, such as oil, gas, sulphur, etc., are usually of relatively limited areal extent and drilling or other operations for mining the deposits must therefore be carried out within well defined areas. On land, or in submerged areas proximate land, no difficulty is experienced in relocating those areas which were previously determined by a prospecting method to be good prospects.

When, however, a prospect is found at a point relatively remote from, and possibly out of sight of land, it becomes increasingly difficult to ascertain with accuracy where the favorable area is located and also to be able to accurately relocate such area when actual development operations are to be carried out. Without accurate surveying in exploration work, it is difficult to know where additional observations should be made to obtain complete exploratory information. Furthermore, inaccuracies in the determination of location points distorts the size and shape of the indicated subsurface anomalies. Among the problems solved by this invention is that of accurately locating the respective submerged areas covered by a prospecting program and relocating such area with equal accuracy when it is desired to work any of the area.

Briefly, the invention comprehends, inter alia, the prospecting of water covered areas by establishing signal points at predetermined locations in a given area as base points to be used when prospecting so that the prospected locations can be definitely identified during the prospecting operations and also at a later time when working operations are to be carried out. A continuous survey is then made by proceeding along a predetermined course and selectively positioning along such course charges of explosive and, in spaced relation therewith, seismic detectors. The explosive is then discharged and the resulting seismic disturbance is recorded. Also, signals correlated with the time of discharge of the explosive are transmitted from one or more of the signal points and such signal or signals are likewise recorded. Since the locations of the signal points are definitely known, it is therefore possible through well known surveying methods to determine with desired accuracy the shot point of the explosive and likewise the location and extent of tectonic structures located by means of the areal survey.

The primary object of the invention is to survey in an expeditious manner a submerged area for the location of subsurface geological structures and to accurately locate surveying operations and the tectonic structures located thereby.

An important object of the invention is the expeditious and accurate location of anomolous geological formations in submerged areas, such locations including depth and extent and, as well, the exact geographical location of such formations.

Another object is to provide a method in which spaced signal points are accurately located in the submerged area and signals from such points are coordinated with the taking observations relating to geological structures so that such structures are accurately geographically located.

The invention also comprehends the utilization of novel equipment whereby explosive charges can be desirably positioned within the submerging medium and thereafter discharged in proper sequence during translation of surveying equipment along a predetermined course.

Still another object is to provide a surveying system for submerged areas and including signal means located at definite geographical points and operating in cooperation with surveying instrumentalities to produce records including information of the subsurface structures and their geographical locations.

Still another object is to provide a novel prospecting system and method for surveying water covered areas whereby surveying may be carried out during daylight or darkness and unhampered by the presence of fog when normally visible reference points are obscured.

A further object is to provide a surveying system including a shooting cable of novel construction to be towed through the submerging medium overlying a submerged surface and adapted to discharge explosive charges during the towing operation.

A still further object is to provide a novel shooting cable to be towed through a submerging medium and including conductors energized at the towing source to discharge an explosive which is lowered into the submerging medium for relative movement with, and to a predetermined point on the cable.

These and other objects will be more fully apparent from a consideration of the following description taken in connection with the accompanying drawings wherein:

Fig. 1 is a sectional view through a submerged area illustrating an embodiment of the applicant's novel method and equipment of the invention, parts of the equipment being shown in relative positions prior to the positioning of seismic detectors preparatory to the creation of a seismic disturbance;

Fig. 2 is a plan view of Fig. 1;

Fig. 3 is similar to Fig. 1 but showing the relative position of parts when a seismic record is being made from a seismic disturbance created rearwardly from the detectors;

Fig. 4 is similar to Fig. 3 but shows the making of a second seismic record from a seismic disturbance created at a point in advance of the detectors;

Fig. 5 is an enlarged fragmentary view, partly in section, of the shooting cable used in the practice of the invention and schematically illustrating electric circuits also constituting a part of the system of the invention;

Fig. 6 shows the end of the shooting cable and a rider utilized therewith for discharging an explosive to create a seismic disturbance;

Fig. 7 shows the rider in position to discharge the explosive connected thereto.

In Figs. 1, 3 and 4 there are shown sectional views through a body of water 1 overlying the submerged surface 2 beneath which there is located a subsurface geological structure 3 of which there is located a subsurface geological structure 3 of which information is desired. Positioned at predetermined points within the body of water 1 are located a plurality of signal buoys 4 and 5 which are restrained in such positions as by means of the anchor 6, and of which includes hydrophones 7 and 8 capable of detecting the waves traveling through the water from the shot point and initiating actuation of equipment of mechanism within such buoys so that signals may be transmitted from the antennae 9 and 10 extending upwardly from the buoys.

Cooperating with the signalling buoys is means for proceeding along a predetermined course in the body of water 1, and such means is shown as comprising a vessel 22 which is equipped with suitable instrumentalities for creating seismic disturbances and making desired records in a manner well known in the art. Such equipment includes a long shooting cable 11 which is towed through the body of water 1 and which is adapted, as will more fully appear, to discharge an explosive at a point in the water remote from the vessel. When spaced charges of explosives are to be discharged in close succession a spaced and shorter shooting cable 12 is also provided.

As best seen in Fig. 5, each of the cables 11 and 12 includes a pair of conductors 13 and 14 encased within a protective and insulated rubber sheet 15. The respective conductors terminate in contactors such as the flexible members 16 and 17 which extend divergingly outwardly and rearwardly and such conductors constitute the terminals of an electric circuit including a generator 18 and a suitable switch 19 on the vessel 22. A suitable signal circuit 20 is connected to this shooting circuit to provide a recordable signal at the approximate instant an explosion is created by the passage of an electric current through the contactors 16 and 17 during exploration operations. The switch 19 may be maintained closed, but in view of the conduction of an electric current through the water between the contactors 16 and 17 it is preferable to provide an additional conductor or conductors 21 in one of the conductor cables 11 or 12 and to provide a switch 25 which may be closed as the explosive charge approaches the contactors 16 and 17. Closure of the switch 25 operates to provide a desired signal at the indicator panel 26 aboard the vessel 22 whereupon the operator may close the switch 19 preliminary to the discharge of the explosive charge. It is to be understood of course that, if desired, the signal which is transmitted by closure of switch 25 may be utilized to automatically initiate operation of equipment aboard the vessel 22 so that the recording will take place automatically.

An important adjunct to the shooting cable just described is a rider 30 (Figs. 6 and 7), provided with eyes 31 and 32 which are adapted to move slidably over the shooting cable and to simultaneously engage the contactors 16 and 17. Attached to the eyes 31 and 32 are conductors 33 which are connected to an explosive charge 34 so that an electrical potential applied to the eyes 31 and 32 will cause a current to flow through the conductors 33 and to initiate discharge of the explosive 34.

The eyes 31 and 32 are of such internal dimension as to compress the insulation surrounding the switch 25 sufficiently that the switch is closed and a signal is transmitted to the panel 26 indicating that the rider 30 and its associated charge are in proximity to the contactors 16 and 17. It may also be here noted that the rider 30 is of inexpensive construction, and having passed over the contactors 16 and 17, is released from the conductor cable and is discarded, a feature which is of importance in continuous prospecting in accordance with the invention.

An additional cable 40 is also towed by the vessel 22 and such cable is provided at its rearward end with spaced branches 41 each of which is attached to a detector carrier 42. Each of these carriers embodies a detector for seismic waves and such detector is connected through the conductor cable 40 to suitable recording equipment within the vessel 22. The carrier for each of the detectors is so constructed that, during towing, the detector assemblies will assume a position within the water 1 such as that indicated in Fig. 1.

The forward end of the cable 40 is formed into a loop 45 which may be released when desired, whereupon towing of the carriers 42 is discontinued during continued forward movement of the vessel 22 whereby the carriers 42 are permitted to move to a position within or at the bottom of the water 1 as the vessel 22 moves forward and the portion of the cable comprising the loop 45 is taken up.

Further attention is here directed to the nature of the signal buoys 4 and 5. These buoys are of a well known construction, such as the so-called "Sono-Radio-Buoy" described by Herbert Grove Dorsey in "The Application of Physics to Modern Hydrographic Surveying," Dennison University Bulletin, Journal of the Scientific Laboratories, vol. XXXII, August, 1937.

This device comprises essentially a container which serves to provide desired buoyancy and also to house a radio transmitter of which the output is connected to the antenna 9 or 10 of the buoys shown. The radio buoy also includes the hydrophone 7 or 8 which serves as a detector of vibrant energy transmitted through the water 1, and thence to initiate operation of the transmitter at the instant such energy is received by the hydrophone.

The operation of the equipment above described and the manner of carrying out the invention is believed apparent from the description. By way of explanation, it will be assumed that initially the signal buoys 9 and 10 have been positioned at known and desired locations within the submerging medium. The vessel 22 is then directed along a predetermined course and the shooting cables 11 and 12 and the detector cable 40 and detectors 42 are deployed in the manner shown in Fig. 1. An explosive charge together with its carrier 30 is positioned upon the cable 11 and as the vessel 22 advances along its course such charge moves downwardly in the water 1 to a point on the surface 2. During this time and subsequent thereto the cable 11 moves through the eyes 31 and 32 on the carrier 30 and eventually the carrier and its associated charge attain the position shown in Fig. 1.

When the carrier 30 actuates the switch 25 a signal is transmitted to the vessel 22 and the loop 45 of the cable 40 is released so that the detector carriers 42 are permitted to assume a stationary position within the body of water 1, as indicated in Figs. 3 and 4. As such stationary position of the detectors has been attained, the carrier 30 approaches the contactors 16 and 17. In the meantime recording equipment aboard the vessel 22 is placed in readiness for producing a record of the disturbance about to be created. The switch 19 has been closed and accordingly a potential is applied between the contactors 16 and 17 so that an electric current is passed through the conductors 33 to the explosive 34 at the instant contact is made respectively between the eyes 31 and 32 and these contactors. The surge of current from the generator 18 at the instant of contact with the eyes 31 and 32 causes a potential to be created in the circuit 20 and this potential is utilized to provide a record of the instant of creation of the disturbance.

Detonation of the explosive 34 creates a disturbance indicated at 49 and, as a result, wave energy is transmitted along the lines 47 and 48 to the hydrophones 7 and 8. Also seismic waves travel downwardly, as indicated by the lines 50, to the formation 3 and thence upwardly along lines 51 to the detectors 42. The impulses received by the respective detectors 42 are transmitted through the cable 40 to recording apparatus aboard the vessel 22, it being understood that the loop 45 has in the meantime not been completely taken up during the forward progress of the vessel 22.

The energy transmitted through the water 1 along the lines 48 and 48' to the hydrophones 7 and 8 of the signal buoys 4 and 5 initiates the transmission of signals from the antennae 9 and 10. These signals travel along the lines indicated at 46 and 47 to the antennae 52 carried by the vessel 22 so that a record is also made of the approximate instant at which vibrations from the source of disturbance 49 are received at the respective buoys 9 and 10. The record from the respective buoys can be obviously identifiable by providing different frequencies for different buoys or otherwise different and identifiable signals. From this record, showing the relative time of arrival of the signals, and with information available as to the velocity of travel of the respective signal impulses, it is possible to determine relative locations with desired accuracy. It also seems apparent that, once certain signal buoys have been located in the submerging medium 1, a disturbance may be created at other points to initiate signals so that additional signal buoys may be accurately positioned relative to those previously located.

It is usually desirable, though not imperative in the practice of the invention, to produce a second seismic disturbance on the opposite side of the detectors 42 and to obtain a record of such disturbance. When this is done a charge 34' is lowered upon the cable 12 at such time that this charge will be detonated shortly after the disturbance was created at 49. This disturbance 49' establishes impulses which are transmitted through the water 1 along the lines 47' and 48' to the hydrophones 7 and 8 so that a record is produced in the manner already described. Simultaneously seismic waves are transmitted outwardly from the center of disturbance 49' along the lines 50' to the formation 3, thence returning by way of the lines 51' to the detectors 42. Impulses are thence conducted through the cable 40 to the recording mechanism aboard the vessel 22.

At approximately the time the charge 34' was placed upon the cable 12, a charge 34'' to succeed that previously detonated at 49 is placed upon the cable 11 preliminary to the repetition of the sequence of events just explained.

Referring to Fig. 4, it is to be noted that the vessel 22 has proceeded upon its course, the original carrier 30 has been discharged from the rearward end of the cable 11 and the successive charge 34'' has progressed to the point indicated when the carrier previously placed upon the shorter cable 12 has moved to a position to create the disturbance 49'.

The cycle of operations having been completed, a towing force is then applied to the cable 40 whereby the detectors 42 again rise to the surface as the cable is drawn in to re-form the loop 45 for the succeeding recording which is to take place in the manner above described after the vessel 22 has proceeded a sufficient distance that the carrier 30 carrying the charge 34' is brought into engagement with the contactors 16 and 17 at the rearward end of the cable 11.

While my copending application to which reference has been made and, as well, the foregoing description have referred specifically to the utilization of the seismic method of prospecting, it is to be understood that my inventions are not confined thereto since it is contemplated that the gravimetric, magnetometric or other methods of a geophysical observation may be utilized.

Broadly, the invention comprehends novel method and apparatus for geophysical prospecting over water covered areas in a manner that subsurface structures can be accurately located both as to depth, extent and geographical location.

What is claimed is:

1. A surveying system for submerged areas comprising signal means for transmitting signals in response to a vibratory disturbance in spaced relation with such means, said signal means being positioned at known locations in the submerging medium, means translatable along a predetermined course in the submerging medium, said last mentioned means including means for creating disturbances in the submerging medium, and means for recording the seismic waves and the waves transmitted from said signal means.

2. In a surveying system for seismic exploration of water covered areas from a vessel carrying a seismic recorder, the combination comprising a conductor cable adapted to be towed through the submerging medium, means including an explosive charge movable along said cable during continued progress of the vessel, and means on said cable energized through the conductors in the cable for discharging the explosive charge when the cable has moved a predetermined distance relative to said first mentioned means.

3. A seismic surveying system for submerged areas including, a conductor cable adapted to be towed through the submerging medium, spaced contactors connected to the conductors within and extending outwardly from said cable, and means including an explosive charge adapted to be positioned on said cable so that the towed cable moves relative thereto and engages said contactors to conduct an electric current to explode the charge.

4. A seismic surveying system for submerged areas including, a conductor cable adapted to be towed through the submerging medium, spaced contactors connected to the conductors within and extending outwardly from said cable, means including an explosive charge adapted to be positioned on said cable so that the towed cable moves relative thereto and engages said contactors to conduct an electric current to explode the charge, and means on said cable operable by said last means at a point in spaced relation with the contactors to transmit a signal to the towing end of the cable.

5. In a seismic surveying system for submerged areas, a conductor cable having conductors therein, a rider including spaced members adapted to move slidably along the cable, and spaced contact members conductively connected to the conductors with the cable and projecting outwardly from the cable to electrically contact said first mentioned members as the cable is drawn therethrough.

6. In a seismic surveying system for submerged areas, a conductor cable, conductors within said cable including resilient contactors extending convergingly outwardly at spaced points along the cable, and means including an explosive charge adapted to be positioned on and move relative to the cable to engage said contactors whereby the explosive is discharged.

7. A seismic surveying system for submerged areas including a vessel movable in a predetermined course in the submerging medium, a conductor cable adapted to be towed through the submerging medium and including conductors to be energized from a source of electrical energy, spaced contactors conductively connected to said conductors and extending outwardly from the cable, and explosive means slidable along said cable and adapted to engage said contactors to discharge said last mentioned means during continued movement of the vessel.

8. In a surveying system for submerged areas the combination of a vessel movable on a predetermined course in the submerging medium, a conductor cable adapted to be towed by the vessel through the submerging medium, a rider slidable upon said cable, and means operable by said rider at a predetermined point along the cable for transmitting a signal to the vessel upon arrival of the rider at such point.

JOHN W. FLUDE.